US011102565B1

(12) United States Patent
Girardier et al.

(10) Patent No.: US 11,102,565 B1
(45) Date of Patent: Aug. 24, 2021

(54) LOW LATENCY BLUETOOTH EARBUDS

(71) Applicant: TAP Sound System, Fontenay-sous-Bois (FR)

(72) Inventors: Thomas Girardier, Bourg la Reine (FR); Antoine Soulier, Carrières sur Seine (FR)

(73) Assignee: TAP Sound System, Fontenay-sous-Bois (FR)

( * ) Notice: Subject to any disclaimer, the term of this patent is extended or adjusted under 35 U.S.C. 154(b) by 0 days.

(21) Appl. No.: 17/157,271

(22) Filed: Jan. 25, 2021

Related U.S. Application Data

(60) Provisional application No. 63/007,371, filed on Apr. 9, 2020.

(51) Int. Cl.
*H04R 1/10* (2006.01)
*G10L 19/24* (2013.01)
*H04W 4/80* (2018.01)

(52) U.S. Cl.
CPC ............ *H04R 1/1016* (2013.01); *G10L 19/24* (2013.01); *H04W 4/80* (2018.02); *H04R 2420/07* (2013.01)

(58) Field of Classification Search
CPC ... H04R 1/1016; H04R 2420/07; H04W 4/80; G10L 19/24
See application file for complete search history.

(56) References Cited

U.S. PATENT DOCUMENTS

| | | | |
|---|---|---|---|
| 7,774,027 B2 | 8/2010 | Parikh et al. | |
| 8,203,977 B2 | 6/2012 | Walley et al. | |
| 8,792,945 B2 | 7/2014 | Russell et al. | |
| 8,909,219 B2 | 12/2014 | Singh et al. | |
| 9,210,358 B2 | 12/2015 | Griffin | |
| 9,398,620 B1 * | 7/2016 | Lazzeroni | H04M 1/72412 |
| 9,712,266 B2 | 7/2017 | Linde et al. | |
| 10,477,370 B2 | 11/2019 | Kerai | |
| 2010/0273417 A1 | 10/2010 | Tian et al. | |
| 2010/0285750 A1 | 11/2010 | Simonelic | |
| 2011/0274156 A1 | 11/2011 | Mighani et al. | |
| 2013/0201397 A1 | 8/2013 | Ayoub et al. | |

(Continued)

OTHER PUBLICATIONS

"Meet the Qualcomm aptX Family", Qualcomm Technologies (Available at https://www.aptx.com/which-aptx) (Accessed on Apr. 14, 2021).

(Continued)

*Primary Examiner* — David L Ton
(74) *Attorney, Agent, or Firm* — Daylight Law, P.C.

(57) ABSTRACT

Methods for communicating audio and voice signals as well as hearable devices therefor are disclosed. A disclosed method includes creating an audio and voice Bluetooth communication link between a computing device and a hearable device. The audio and voice Bluetooth communication link includes a downlink and an uplink. The method further includes configuring the downlink with a downlink audio codec and the uplink with an uplink voice codec and receiving, by the hearable device through the downlink, a channel of a downlink audio signal from the computing device. The channel is encoded with the downlink audio codec. The method further includes transmitting, to the computing device, an uplink voice signal by the hearable device through the uplink. The uplink voice signal is encoded with the uplink voice codec.

20 Claims, 10 Drawing Sheets

(56) References Cited

U.S. PATENT DOCUMENTS

| | | |
|---|---|---|
| 2014/0233527 A1 | 8/2014 | Gehring et al. |
| 2015/0334488 A1* | 11/2015 | Kim .................. H04W 4/06 381/2 |
| 2016/0191181 A1 | 6/2016 | Bailey |
| 2016/0359925 A1 | 12/2016 | Song |
| 2017/0168966 A1 | 6/2017 | Mishra et al. |
| 2019/0104423 A1 | 4/2019 | Hariharan et al. |
| 2019/0213166 A1 | 7/2019 | Petkov et al. |
| 2019/0304477 A1 | 10/2019 | Wojcieszak et al. |

OTHER PUBLICATIONS

"What is LDAC?", Sony USA (Available at https://www.sony.com/electronics/support/articles/00146691) (Accessed on Apr. 14, 2021).

* cited by examiner

LOW LATENCY BLUETOOTH EARBUDS

CROSS REFERENCE TO RELATED APPLICATIONS

This application claims the benefit of U.S. provisional patent application No. 63/007,371, filed Apr. 9, 2020, which is incorporated by reference herein for all purposes.

BACKGROUND

Bluetooth defines a communication standard for transmitting data wirelessly over short distances, which are typically limited to up to 10 meters, and using high frequency radio waves, comprised in the Ultra High Frequency, UHF, band, namely, between 300 megahertz and 3 gigahertz. This standard makes Bluetooth devices very popular among customers due to their portability. (Bluetooth is a registered trademark of Bluetooth SIG, Inc.).

Specifically, when transmitting audio data and rendering corresponding audio signals, wireless earbuds are common to offer a user-friendly listening experience in a wide range of applications. They offer great audio quality for sound rendering while being highly portable, and they are best used linked to a smartphone supporting a streaming or a gaming application when using Bluetooth.

In multiple applications, it is important to provide low latency streaming so as to ensure that delays between transmitting and receiving/hearing said audio signals are as short as possible. Although less noticeable for music applications, such delays are problematic for video and gaming applications when the audio signals are out of synchronization with the video rendering or voice exchanges involving several users.

However, the known techniques and apparatuses cannot be applied to the use of the Bluetooth protocol, and involve several drawbacks, some of which are described below.

Firstly, the current state of the art does not provide a sufficiently low latency audio streaming from a source device to one or more sink devices for use in video and gaming applications using Bluetooth links. In particular, latencies smaller than 40 milliseconds cannot be provided for the aforementioned applications. Indeed, audio streaming over Bluetooth links typically relies on Advanced Audio Distribution Profiles, A2DP, which imply latencies of the order of 150 to 200 milliseconds. Such high values are inevitable due to high jitter effects.

FIG. 1 illustrates an example of atypical jitter JIT on a Bluetooth link, which corresponds to a variable difference of time occurring between the successful transmissions of two successive data packets DP1 and DP2. A typical data packet comprises 15 milliseconds of an audio signal so two successive packets should be sent every 15 milliseconds. A variable difference may occur in the case where some data packets require more time to be transmitted due to possible retransmissions, for instance due to errors or data corruption, or because of variable delay introduced by the Controller (the A2DP links being asynchronous). The associated jitter can typically go up to 80 milliseconds and the time between the successful transmissions of two successive data packets may be between 15 milliseconds and 15+80 milliseconds. In order to compensate for this variation and provide a stable/continuous audio playback, an audio buffer of generally 100 milliseconds is used, which induces a contribution of 100 milliseconds in the overall latency.

Secondly, the current state of the art does not provide a bidirectional (or full duplex) high-quality audio and voice communication. Indeed, bidirectional audio communication between two devices is defined in the Bluetooth protocol by the Hands-Free Profile, HFP. While HFP is capable of audio communication, it is in practice only suitable for voice communication, the corresponding codecs being optimized for voice with a sampling frequency typically between 8 and 16 kilohertz and a 64 kilobit per second bitrate. Such codecs are not suitable for a high-quality audio transmission. Indeed, audio signals should be encoded with an audio codec providing higher transmission fidelity for full band signals (frequencies between 20 Hz and 20 kHz), which typically require a bitrate of at least 128 kilobits per second. For these reasons, current Bluetooth audio devices including true wireless earbuds fail to offer an appropriate user experience in specific applications where both voice signals and audio signals are transmitted, such as multiplayer game applications.

In conclusion, there is today a need for providing a low latency playback experience in a wireless system supporting a bidirectional and high-quality audio and voice communication.

SUMMARY

The present disclosure relates to the field of wireless audio and voice data transmission and streaming. Specifically, the present disclosure relates to methods and devices for transmitting data packets and rendering audio and voice signals using Bluetooth.

An object of the present disclosure is to provide methods and devices for providing a low latency, bidirectional and high-quality communication of audio and voice signals in a Bluetooth system.

An object of the present disclosure consists of providing a bidirectional and high-quality communication of audio and voice signals in a Bluetooth system.

Another object of the present disclosure consists of providing low latency for such bidirectional and high-quality communication of audio and voice signals in a Bluetooth system.

To address the aforementioned issue, an object of the disclosure relates to a method for communicating audio and voice signals, said method being carried out by a right hearable device and a left hearable device, wherein the method comprises:

creating a right audio and voice Bluetooth communication link between the right hearable device and a computing device, said right audio and voice Bluetooth communication link comprising a right downlink and a right uplink, creating a left audio and voice Bluetooth communication link between the left hearable device and the computing device, said left audio and voice Bluetooth communication link comprising a left downlink and a left uplink, configuring said right and left downlinks with a downlink audio codec, and at least one of said right and left uplinks with an uplink voice codec, receiving, by the right hearable device through the right downlink, a right channel of a downlink audio signal from the computing device, said right channel being encoded with said downlink audio codec, receiving, by the left hearable device through the left downlink, a left channel of the downlink audio signal from the computing device, said left channel being encoded with the downlink audio codec, transmitting, to the computing device, an uplink voice signal by said at least one of the right hearable device and the left hearable device through the at least one of the right uplink and the left uplink, said uplink voice signal being encoded with said uplink voice codec.

This provides a Bluetooth bidirectional voice and audio communication between a wireless earbuds system and a computing device.

Specifically, said bidirectional communication is provided through one uplink and one downlink, the uplink and the downlink having different codecs. The downlink allows transmitting audio signals from the computing device to the left and the right hearing device while the uplink allows transmitting voice signals from the left and/or the right hearing device to the computing device.

Herein, the audio and/or voice signals correspond to data packets that can be transmitted from one device to another. An audio signal or a voice signal is encoded and packetized into data packets, the transmission of said data packets being carried out through a Bluetooth link. Herein, the expression "data" is equivalent to the "content of a data packet". Herein, a Bluetooth link is a wireless communication link, said wireless communication link referring to a wireless communication between two devices and used to convey an information signal.

Herein, an uplink is a link which allows transmitting a packet, said packet comprising voice data, or signaling, from at least one of the hearable devices to the computing device. A downlink is a link which allows transmitting a packet, said packet comprising audio data and/or voice data, or signaling, from the computing device to at least one of the hearable devices.

Herein, the creation of the right audio and voice Bluetooth communication link between the right hearable device and a computing device and the creation of the left audio and voice Bluetooth communication link between the left hearable device and the computing device may be carried out either simultaneously or successively.

Herein, an uplink voice signal can be sent by either one of the left and right hearable devices, or both.

Herein, the computing device can be a smartphone, a personal computer such as a desktop or a laptop, a tablet, a game console, or a dongle adapted to be plugged into a computer USB port or into a smartphone USB-C port, such as a Bluetooth dongle.

Herein, at least one of the left and right hearable devices can be configured to capture a voice signal. For instance, the left and/or right hearable device is an earbud comprising a microphone therefor. The terms "hearable device" and "earbud" will be used interchangeably in the following.

Herein, examples of audio signals adapted to be communicated include a stereo sound signal, a mono sound signal, a stereo voice signal and a mono voice signal. Mono sound and voice signals contain no directional information while stereo sound and voice signals contain synchronized directional information from left and right aural fields. Consequently, stereo signals comprise two channels, a left-channel and a right-channel.

Specifically, herein, an audio signal is preferably digitized with a series of binary numbers and has frequencies between the lower and upper limits of human hearing, which generally corresponds to an audio frequency range of roughly 20 to 20000 Hz and a sampling frequency of at least 44100 Hz.

Herein, a voice signal is preferably digitized with a series of binary numbers and has frequencies used in the transmission of speech, which generally corresponds to a sampling frequency of at least 8000 Hz and below 16000 Hz. Further, an audio signal can include a voice signal.

Herein, a codec is any algorithm for encoding and/or decoding a digital data stream or signal. For instance, a codec may be used to encode an audio signal which is to be conveyed on a Bluetooth audio stream with a decreased bitrate. A codec can be implemented as a computer program and can be run for instance on a general-purpose processor or a digital signal processor.

For instance, an audio signal to be transmitted may be provided by an audio server of the computing device mixing audio data from a streaming application (music or video application) and incoming voice data from a voice application (VoIP or phone call application) such that both data can be rendered at the same time. The audio signal to be transmitted may also be provided by a gaming application wherein a voice channel is established such that voice data can be carried by said voice channel, and mixed, or not, with audio data from the gaming application.

In possible embodiments, only one of the left and right hearable devices is configured to send a mono voice signal, for instance a mono voice signal captured by a microphone of said hearable device. In other embodiments where both of the left and right hearable devices are configured to send a mono voice signal, two voice signals can be sent separately by each of the hearable devices to the computing device, which allows improving the rendering of a mono voice signal by combining two microphone inputs and processing them by the computing device.

In a specific embodiment, the downlink audio codec is adapted for encoding the downlink audio signal with a sampling rate larger than 44100 Hz and smaller than 96000 Hz and wherein the uplink voice codec is adapted for encoding the uplink voice signal with a sampling rate larger than 8000 Hz and smaller than 16000 Hz.

Different embodiments also relate to advantageous communication schemes for transmitting data packets of the audio and voice signals.

For instance, data packets can be transmitted from the computing device to at least one of the two hearable devices through the configured downlink with a first bitrate and data packets can be transmitted from said one hearable device to the computing device through the configured uplink with a second bitrate, said first and second bitrates being equal. This provides a symmetrical operation mode when transmitting data packets between a computing device and one or more hearable devices.

In an alternative, said first and second bitrates are different. This provides an asymmetrical bitrate operation mode when transmitting data packets between a computing device and one or more hearable devices.

In possible embodiments, the left and right configured downlinks have different bitrates, and/or the left and right configured uplinks have different bitrates.

In a specific embodiment, the downlink audio codec comprises at least one of an Opus codec, an AAC codec, a SBC codec, a LC3 codec, a LDAC codec, a LHDC codec and an AptX codec.

In a specific embodiment, the uplink voice codec comprises at least one of a LC3 codec, a mSBC codec and a CVSD codec.

In a specific embodiment, an acknowledgment of the receiving by at least one of the left hearable device and the right hearable device is included in the transmitting of the uplink voice signal.

Herein, the acknowledgment of a data packet of the downlink audio signal received by a hearable device can be contained in the next data packet of the uplink voice signal transmitted to the computing device. This allows avoiding the use of a signaling packet for acknowledgment.

In a specific embodiment, an acknowledgment of the receiving by at least one of the left hearable device and the right hearable device is transmitted using one of the uplinks before the transmitting of the uplink voice signal.

Herein, the acknowledgment of a data packet of the downlink audio signal received by a hearable device can be contained in the next signaling packet transmitted to the computing device through the uplink before the transmission of the next data packet of the uplink voice signal.

In a specific embodiment, the acknowledgment scheme is bidirectional.

Herein, a bidirectional acknowledgment scheme means that both data coming from the computing device and data coming from the hearable devices are acknowledged.

Herein, the acknowledgment of a data packet of the uplink voice signal transmitted by a hearable device can be contained in the next signaling packet transmitted by the computing device to the hearable device through the downlink.

In a specific embodiment, the uplink voice signal is sent from the right hearable device, from the left hearable device or from both the left hearable device and the right hearable device.

A second object of the present disclosure consists of providing a low latency communication of audio and voice signals in a Bluetooth system.

To address the aforementioned issue, in a specific embodiment, each of the right and left audio and voice Bluetooth communication links comprises a constant rate isochronous link.

Herein, a constant rate isochronous link is a link such that data is transferred in accordance with a clock signal at a predetermined constant rate. It can be achieved by reserving regular slots on the physical channel and transmitting packets at these regular intervals with limited retransmission intervals. Bluetooth constant rate isochronous logical links include SCO-S, eSCO-S, LE-S and LE-F.

This allows performing low latency voice and audio bidirectional streaming between the computing device and the left and right hearable devices.

Indeed, constant rate isochronous links are not subject to important jitter and ensure a latency compliant with the standards of gaming applications. In particular, latencies lower than 50 milliseconds can be achieved while simultaneously providing bidirectional audio and/or voice streaming.

In a specific embodiment, the Bluetooth communication link comprises a single bidirectional constant rate isochronous link.

In another specific embodiment, the Bluetooth communication link comprises a two unidirectional constant rate isochronous links.

In a specific embodiment, the constant rate isochronous link is one of an SCO link, an eSCO link, and a BLE isochronous link.

Herein, a SCO link is a Synchronous Connection-Oriented link, an eSCO link is an enhanced SCO link and a BLE isochronous link is a Bluetooth Low Energy isochronous link.

In a specific embodiment, the two constant rate isochronous links are scheduled using a reference clock of the computing device, the method further including:
  synchronizing a local clock of each hearable device with the reference clock; and
  rendering each channel of each hearable device based on their respective local clocks.

This allows synchronizing the outputs of the left channel and the right channel on the left hearable device and the right hearable device.

In a specific embodiment, the rendering includes compensating a time interval between a transmission window of the right Bluetooth communication link and a transmission window of the left Bluetooth communication link.

In a specific embodiment, the compensating of the time interval is carried out by one of the right hearable device, the left hearable device and the two hearable devices.

In a specific embodiment, each of the transmission window of the right Bluetooth communication link and the transmission window of the left Bluetooth communication link includes a retransmission window.

For instance, the receiving of the downlink audio signal and/or the transmitting of the uplink voice signal comprises a retransmission of at least one data packet. Specifically, said retransmission of said at least one data packet may be carried out by one of the computing devices and/or at least one of the left and right hearable devices.

Another object of the present disclosure is to provide a hearable device for rendering an audio signal, wherein said hearable device comprises:
  an antenna, and
  a circuit, such as a processor or a processing unit, said circuit being operatively coupled to said antenna,
wherein the antenna and the processing element are configured to
  create an audio and voice Bluetooth communication link between a computing device and the hearable device, said audio and voice Bluetooth communication link comprising a downlink and an uplink;
  configure said downlink with a downlink audio codec and said uplink with an uplink voice codec;
  receive, by the hearable device through the downlink, a channel of a downlink audio signal from the computing device, said channel being encoded with said downlink audio codec; and
  transmit, to the computing device, an uplink voice signal by the hearable device through the uplink, said uplink voice signal being encoded with said uplink voice codec.

Another object of the present disclosure is to provide one or more non-transitory computer readable storage medium, having stored thereon a computer program comprising program instructions, the computer program being loadable into a processor and adapted to cause the processor to carry out a method for communicating audio and voice signals, said method being carried out by a right hearable device and a left hearable device, wherein the method comprises:
  creating a right audio and voice Bluetooth communication link between the right hearable device and a computing device, said right audio and voice Bluetooth communication link comprising a right downlink and a right uplink,
  creating a left audio and voice Bluetooth communication link between the left hearable device and the computing device, said left audio and voice Bluetooth communication link comprising a left downlink and a left uplink,
  configuring said right and left downlinks with a downlink audio codec, and at least one of said right and left uplinks with an uplink voice codec,
  receiving, by the right hearable device through the right downlink, a right channel of a downlink audio signal from the computing device, said right channel being encoded with said downlink audio codec, receiving, by the left hearable device through the left downlink, a left channel of the downlink audio signal from the computing device, said left channel being encoded with the downlink audio codec, transmitting, to the computing device, an uplink voice signal by said at least one of the right hearable device and the left hearable device through the at least one of the right uplink and the left uplink, said uplink voice signal being encoded with said uplink voice codec.

Other features, details and advantages of the objects of the disclosure will be apparent from the following detailed description given by way of non-limiting example, with reference to the accompanying drawings, as described hereafter.

DETAILED DESCRIPTION

Figures and the following detailed description contain, essentially, some exact elements. They can be used to enhance the understanding of the disclosure and, also, to define the disclosure if necessary.

Figure 1:
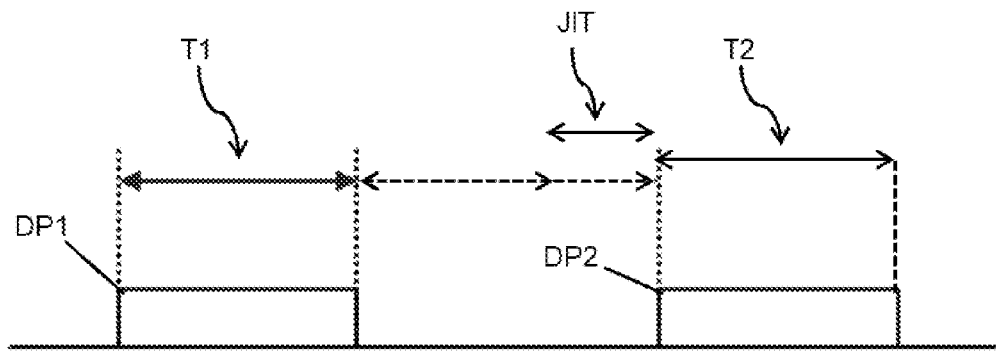
FIG. 1, already described, illustrates an example of jitter on a Bluetooth link.
Figure 2:
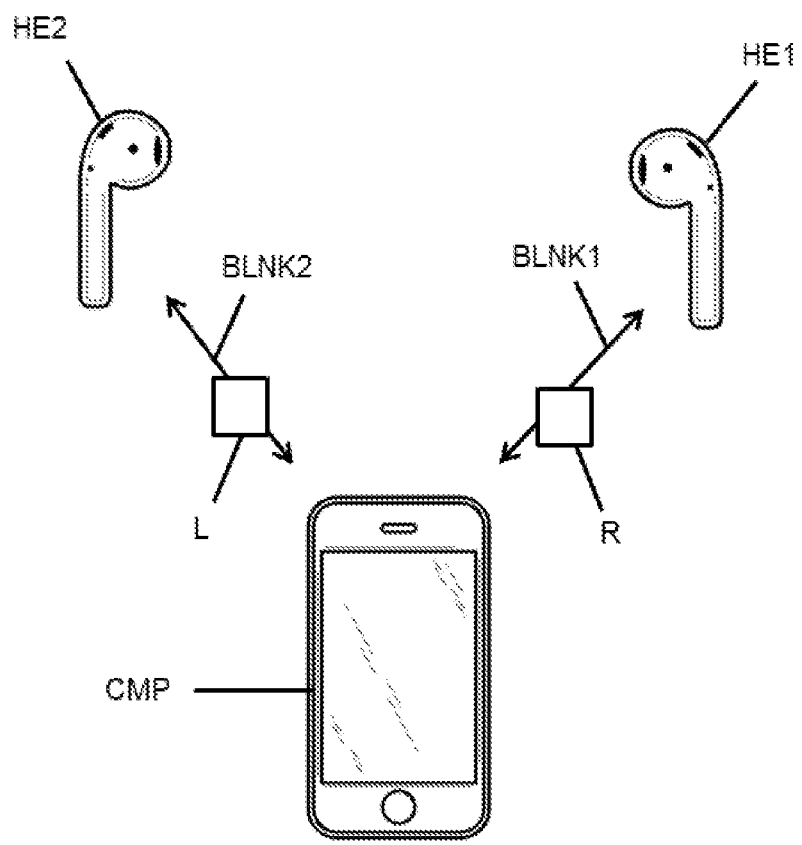
FIG. 2 illustrates an architecture for a wireless audio system in accordance with specific embodiments disclosed herein.

FIG. 2 illustrates an architecture for a wireless audio system according to a possible embodiment of the present invention.

Specifically, the illustrated wireless audio system is based on a dual constant rate isochronous bidirectional streaming architecture for a Bluetooth audio system. The system comprises a computing device CMP and two hearable devices HE1 and HE2, each of said Bluetooth hearable devices being an earbud. The first earbud HE1 corresponds to a right earbud and the second earbud HE2 corresponds to a left earbud.

In an example, the first earbud HE1 and/or the second earbud HE2 comprises at least one microphone, said microphone being adapted to capture a voice signal.

A right channel R of a stereo audio signal may be transmitted from the computing device CMP to HE1 via the link BLNK1, and a left channel L of the stereo audio signal may be transmitted from CMP to HE2 via the link BLNK2.

In an example, the audio codecs used for the bidirectional Bluetooth links are identical so as to avoid having different audio qualities for the earbuds. For instance, the standard mandatory SBC codec may be used for each of the streams BLNK1 and BLNK2. As an alternative, other codecs comprise Opus, LC3, LDAC, apt-X or AAC.

Figure 3:
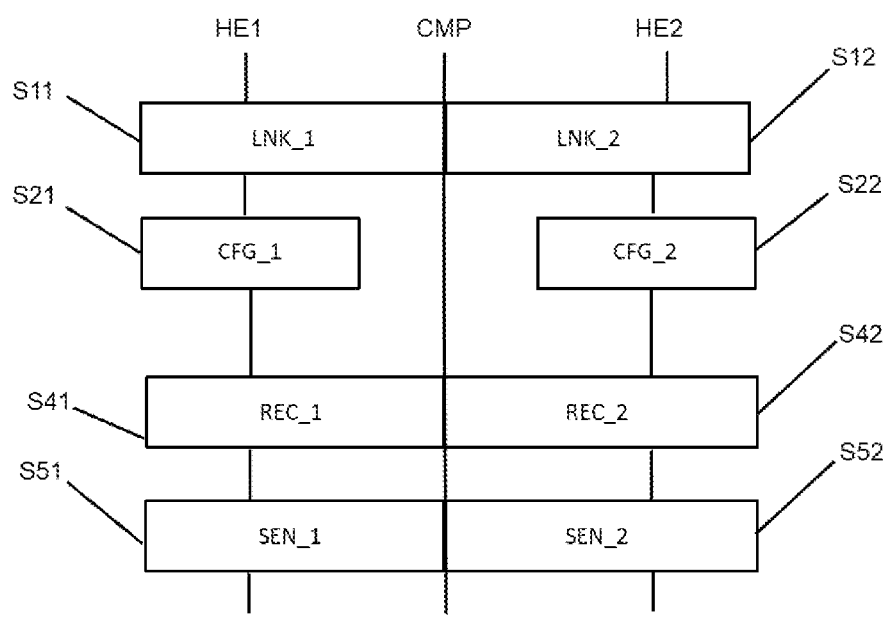
FIG. 3 illustrates a flowchart of method steps in accordance with specific embodiments disclosed herein.

FIG. 3 illustrates a flowchart of method steps for communicating audio and voice signals between a computing device CMP and two hearable devices HE1 and HE2.

Therein, the method steps comprise a step S11 during which a right audio and voice Bluetooth communication link BLNK1 is created between the right hearable device HE1 and the computing device CMP, and a step S12 during which a left audio and voice Bluetooth communication link BLNK2 is created between the left hearable device HE2 and the computing device CMP. The right audio and voice Bluetooth communication link comprises a right downlink and a right uplink, and the left audio and voice Bluetooth communication link comprises a left downlink and a left uplink.

During the step S11, a first isochronous link may be created between the computing device CMP and the right hearable device HE1, said first isochronous link being preferably defined with a constant rate scheduled by CMP.

Simultaneously or successively, a second constant rate isochronous link may be created between the computing device CMP and the left hearable device HE2.

After each of said bidirectional Bluetooth communication links BLNK1 and BLNK2 has been created, steps S21 and S22 are carried out for configuring the downlink and the uplink of each created bidirectional Bluetooth communication link with one or more audio codecs.

Step S21 is carried out between the computing device CMP and the right hearable device HE1 while step S22 is carried out between the computing device CMP and the left hearable device HE2. During each of steps S21 and S22, an uplink codec and a downlink codec are negotiated in view of configuring the aforementioned first and second audio and voice Bluetooth communication link. The negotiation of the uplink codec can be carried out either simultaneously or successively with the negotiation of the downlink codec.

Negotiating a downlink codec allows encoding an audio signal into data packets in view of transmitting such data packets from CMP to HE1 and HE2. Such a downlink codec is advantageously used for both of the hearable devices HE1 and HE2, allowing receiving audio data with the same quality. Also, this allows transmitting data packets to HE1 and HE2 with a same algorithmic delay.

Negotiating an uplink codec allows encoding a voice signal into data packets in view of transmitting such data packets from HE1 and/or HE2 to CMP. In a specific example, the negotiation of an uplink codec is carried out so that voice data captured by a microphone comprised in at least one of the two hearable devices HE1 and HE2 can be encoded.

Relying on an uplink codec which is different from the downlink codec allows optimizing the resources required for encoding/decoding of such voice and audio signals while ensuring quality of their rendering. For instance, the downlink codec may be a first high quality codec used for encoding audio signals coming from the computing device, e.g. sounds produced by a gaming application running on said computing device, and the uplink codec may be a second codec specific for voice encoding, which requires few resources, e.g. Bluetooth bandwidth and CPU usage, used for encoding voice data captured by a microphone of the Bluetooth hearable device.

Following the configuration steps S21 and S22, steps S41 and S42 are carried out so that the audio signal is received through the configured downlinks. In other words, data packets corresponding to said audio signal are received by the first hearable device HE1 during step S41 using the downlink of the right audio and voice Bluetooth communication link BLNK1, and data packets are received by the second hearable device HE2 during step S42 using the downlink of the left audio and voice Bluetooth communication link BLNK2.

In an example, each of the two hearable devices HE1 and HE2 is associated with a specific audio channel, and in particular, a left and/or a right channel(s) configured to render an audio signal in a stereo mode.

Following the steps S41 and S42, at least one of the steps S51 and S52 is carried out wherein, when step S51 is carried out, an uplink voice signal is transmitted by the right hearable device HE1 to the computing device CMP through the right uplink and, when step S52 is carried out, the uplink voice signal is transmitted by the left hearable device HE2 to the computing device CMP, said uplink voice signal being encoded with said uplink voice codec.

Additionally, and following steps S51 and/or S52, further steps may be carried out, said steps comprising for instance rendering a left channel audio signal from HE1 and a right channel audio signal from HE2.

Having two constant rate isochronous links allows a low latency, bidirectional and high-quality transmission of said audio and voice signals.

Figure 4:
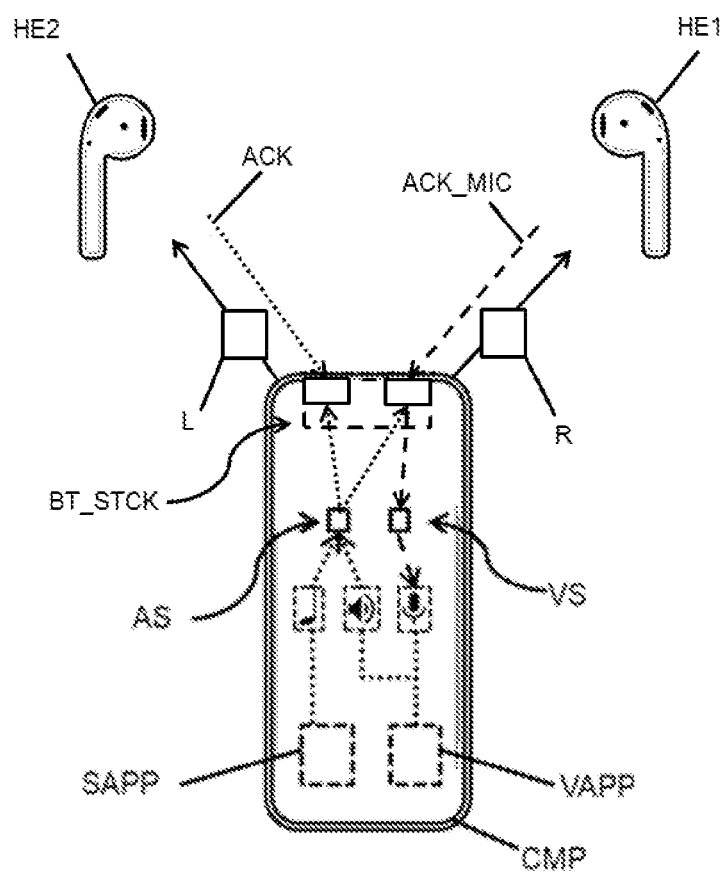
FIG. 4 illustrates communication of audio and voice signals in a wireless audio system architecture in accordance with specific embodiments disclosed herein.

FIG. 4 illustrates communication of audio and voice signals in a wireless audio system architecture according to an embodiment of the disclosure.

As illustrated, a streaming application SAPP and a voice application VAPP are running on the computing device CMP. Said streaming application SAPP produces sounds, such as music, which correspond to audio signals AS which are communicated as such to the Bluetooth stack BT_STCK of the computing device CMP. Herein, the Bluetooth stack BT_STCK is comprised within the computing device CMP.

The voice application VAPP receives voice data from a voice channel with at least another computing device, which are also communicated as audio signals AS to the Bluetooth stack BT_STCK. Typically, the received voice data is carried over the Internet. The Bluetooth stack BT_STCK transmits the audio signals to the hearing device HE1 using the right downlink and to the hearing device HE2 using the left downlink. The voice application VAPP also receives microphone data as voice signals VS from the Bluetooth stack BT_STCK and transmits them to the at least another computer device through the voice channel.

Each of the hearable devices HE1 and HE2 may be configured to receive at least one channel of the audio signals AS. For instance, if the audio signals AS comprise at least one stereo audio signal, the right hearable HE1 device may receive a right channel R of said stereo audio signal and the left hearable device HE2 may receive a left channel L of said stereo audio signal. In more general situations, additional channels can be present provided that said additional channels are separated between each of the hearable devices HE1 and HE2.

In specific embodiments, the transmitted audio signals AS comprise a mixing of audio data from the streaming application SAPP, e.g. a music application, a gaming application or a video application, and incoming voice data being provided by the voice application VAPP, e.g. a voice application, a VoIP application or a phone call application, so that both audio and voice data can be rendered at the same time.

In specific embodiments, the streaming application is a gaming application configured to stream audio data, said audio data comprising the game sound effects, wherein the voice application is a voice chat application configured to establish a voice channel such that voice data can be communicated by said voice channel and wherein the audio data and voice data are mixed together.

In specific embodiments, the streaming application and the voice application are embedded in a single application, such as a gaming application with a native voice chat.

Upon receipt of the right channel R of the audio signal through the right downlink, the hearing device HE1 transmits a corresponding acknowledgment and microphone data as voice signals VS through the right uplink as ACK_MIC. Said corresponding acknowledgment and voice signals may be transmitted in a same Bluetooth packet or in two different packets.

Upon receipt of the left channel L of the audio signal through the left downlink, the hearing device HE2 transmits a corresponding acknowledgment ACK through the left uplink.

In specific embodiments, at least one voice signal is transmitted by at least one of the two hearable devices HE1 and HE2.

Different examples of transmission schemes are now described.

Figure 5:
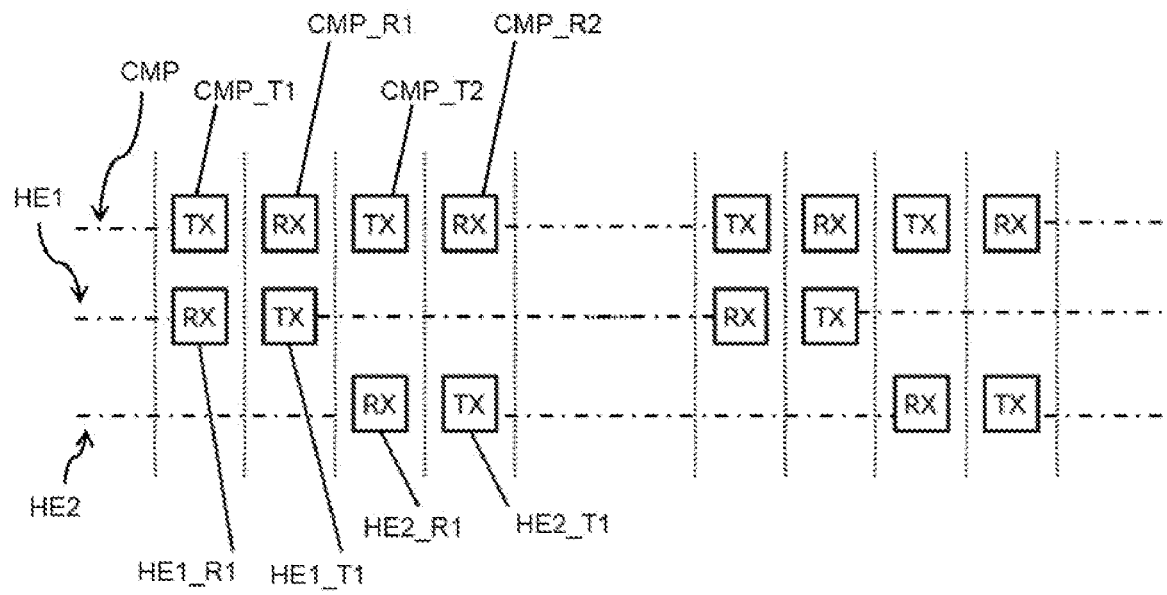
FIG. 5 illustrates a first transmission scheme with a symmetrical bitrate operation mode in accordance with specific embodiments disclosed herein.

A first example of transmission scheme is shown in FIG. 5 in the case of a symmetrical operation mode for transmitting and receiving data packets between a computing device and hearable devices.

Herein, each of the bidirectional Bluetooth links comprises a downlink and an uplink, on which audio and voice signals can be sent into data packets.

Herein, one distinguishes between transmission packets, TX, and reception packets, RX. For a Bluetooth hearable device, a packet transmitted by the computing device to the Bluetooth hearable device corresponds to a reception packet and a packet transmitted by the Bluetooth hearable device to the computing device corresponds to a transmission packet. Conversely, for the computing device, a reception packet for a Bluetooth hearable device corresponds to a transmission packet and a transmission packet for a Bluetooth hearable device corresponds to a reception packet.

In a specific example of the symmetrical operation mode, data packets transmitted over the downlink and the uplink of the audio and voice Bluetooth communication links have an identical size. For instance, the audio and voice Bluetooth communication links are eSCO links, wherein downlink and uplink data packets are 1-slot packets, each time slot corresponding to 625 microseconds.

The transmission packet CMP_T1 for the computing device CMP corresponds to a reception packet HE1_R1 for the right hearable device HE1. This allows right channel audio data to be received by the right hearable device HE1.

The transmission packet HE1_T1 corresponds to the reception packet CMP_R1. In an example, this allows an acknowledgment and voice data to be transmitted to CMP. For instance, the right hearable device acknowledges the computing device CMP of a successful reception of said packet, and simultaneously sends voice data corresponding to a voice signal captured by the microphone of HE1 to CMP. Therefore, advantageously, this allows using a same data packet for transmitting both an acknowledgment and voice data, which minimizes the latency.

In an example, the acknowledgment is transmitted implicitly by the Bluetooth hearable device to the computing device upon receipt of a data packet by said Bluetooth hearable device.

In an example not illustrated in the present case, the acknowledgment is transmitted in a signaling packet before the transmission of the voice data packet.

Similarly, the transmission packet CMP_T2 for the computing device CMP corresponds to the reception packet HE2_R1 for the left hearable device HE2. This allows left channel audio data to be received by the left hearable device HE2.

The transmission packet HE2_T1 corresponds to the reception packet CMP_R2. In an example, this allows an acknowledgment to be transmitted to CMP. HE2 may not send voice data back to the computing device CMP since a mono voice data input would be insufficient.

In an example, the left hearable device HE2 also sends voice data to the computing device CMP, either to receive a stereo voice signal or to enable CMP to produce an enhanced mono voice signal based on both right and left voice data inputs.

In an example, a selection may be performed manually or automatically between sending voice data captured by a microphone of HE1 or voice data captured by a microphone of HE2. Advantageously, such a selection may be carried out dynamically by the corresponding Bluetooth hearable device depending on which earbud among a left earbud and a right earbud is worn by the user, and/or on in which of the ears of a user an earbud is worn.

This allows selecting a Bluetooth hearable device among a plurality of hearable devices for carrying out an improved input capture of voice data. For instance, if a Bluetooth hearable device comprises a left-side earbud and a right-side earbud, and if a user removes one of said two earbuds from one of his/her ears, the Bluetooth hearable device(s) may be configured so that voice data can be captured only by the earbud being worn.

Advantageously, such transmission scheme can avoid overlapping and conflicting transmission time intervals between the two hearable devices HE1 and HE2.

Advantageously, such transmission scheme can be carried out using constant rate isochronous links such as eSCO links so as to provide low latency bidirectional audio and voice Bluetooth communication.

Figure 6:
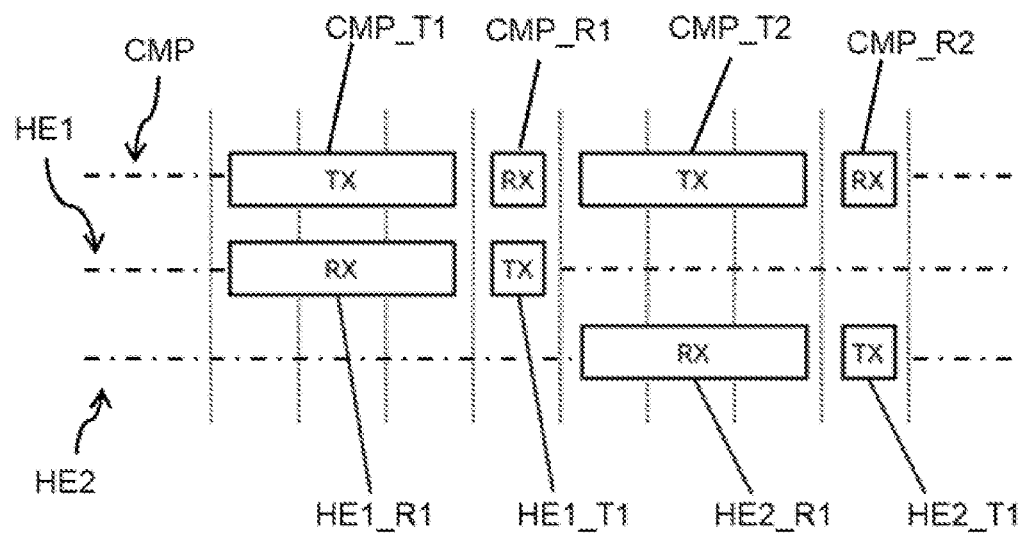
FIG. 6 illustrates a second transmission scheme with an asymmetrical bitrate operation mode in accordance with specific embodiments disclosed herein.

In FIG. 6, a second transmission scheme is shown, which corresponds to the case of an operation mode with asymmetrical bitrates for uplink and downlink.

As illustrated, different sizes for the packets of the uplink and the downlink can be used. For instance, asymmetrical bitrates with 3-slots downlink packets and 1-slot uplink packets are used.

Advantageously, such an asymmetrical bitrate operation mode can be carried out with an uplink codec which is different from the downlink codec. Relying on an uplink codec which is different from the downlink codec, allows optimizing the resources required for encoding/decoding of the voice and audio signals while ensuring quality of their rendering, as previously described.

Specifically, and compared to the previous symmetrical operation mode, the size of the data packets TX transmitted from the computing device CMP is three times larger than the size of each of the reception packets RX received by the computing device CMP. Correspondingly, the size of the reception packets RX received by the hearable devices HE1 and HE2 is three times larger than the size of each of the corresponding transmission packets TX sent by each of the hearable devices HE1 and HE2.

This allows the downlinks bitrate to be larger than the uplinks bitrate, which allows selecting a downlink codec for performing audio encoding and an uplink codec for performing voice encoding. This allows receiving high-quality audio data, encoded with the downlink codec, by the hearable devices which requires higher bitrate than the voice data encoded with the uplink codec transmitted by at least one of the hearable devices.

In the present example, HE1_R1 corresponds to high quality right-channel audio data reception, HE1_T1 comprises acknowledgment and transmission of voice data by the microphone of HE1, HE2_R1 corresponds to high quality left-channel audio data retransmission and HE2_T1 comprises an acknowledgment.

Advantageously, such transmission scheme can be carried out using constant rate isochronous links such as eSCO links so as to provide low latency bidirectional audio and voice Bluetooth communication.

Figure 7:
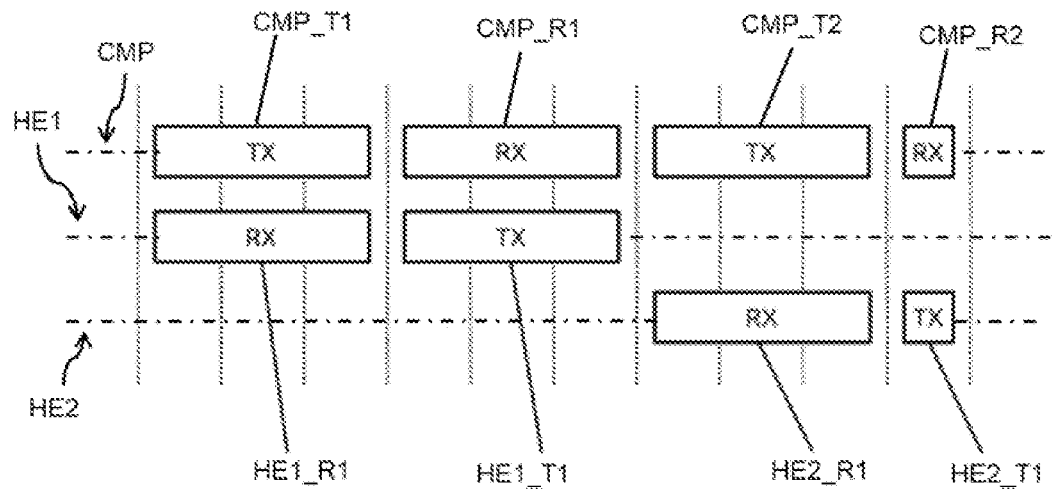
FIG. 7 illustrates a third transmission scheme with asymmetrical links in accordance with specific embodiments disclosed herein.

In FIG. 7, a third transmission scheme is shown, which corresponds to the case of an operation mode with asymmetrical audio and voice Bluetooth communication links.

As illustrated, one of the audio and voice Bluetooth communication links may use a symmetrical bitrate and the other may use an asymmetrical bitrate. For instance, the right audio and voice Bluetooth communication link uses a symmetrical bitrate and the left audio and voice communication link uses an asymmetrical bitrate.

For instance, 3-slots packets are used for the reception packet HE1_R1 and the transmission packet HE1_T1 (respectively for the transmission packet CMP_T1 and the reception packet CMP_R1) and 3-slots packets are used for the reception packet HE2_R1 while 1-slot packets are used for the transmission packet HE2_T1 of HE2 (respectively for the transmission packet CMP_T2 and the reception packet CMP_R2).

For instance, HE1_R1 corresponds to a received high-quality right-channel audio data packet. HE1_T1 comprises both an acknowledgment of the reception of said packet and high-quality transmission of voice data by the microphone of HE1. HE2_R1 corresponds to high quality left-channel audio data reception and HE2_T1 comprises a corresponding acknowledgment.

In an example, the two audio and voice Bluetooth communication links may use two different asymmetrical bitrates.

Advantageously, such an operation mode with asymmetrical audio and voice Bluetooth communication links can be carried out for high-quality voice encoding requiring a high uplink bitrate.

Advantageously, such transmission scheme can be carried out using constant rate isochronous links such as eSCO links so as to provide low latency bidirectional audio and voice Bluetooth communication.

Figure 8:
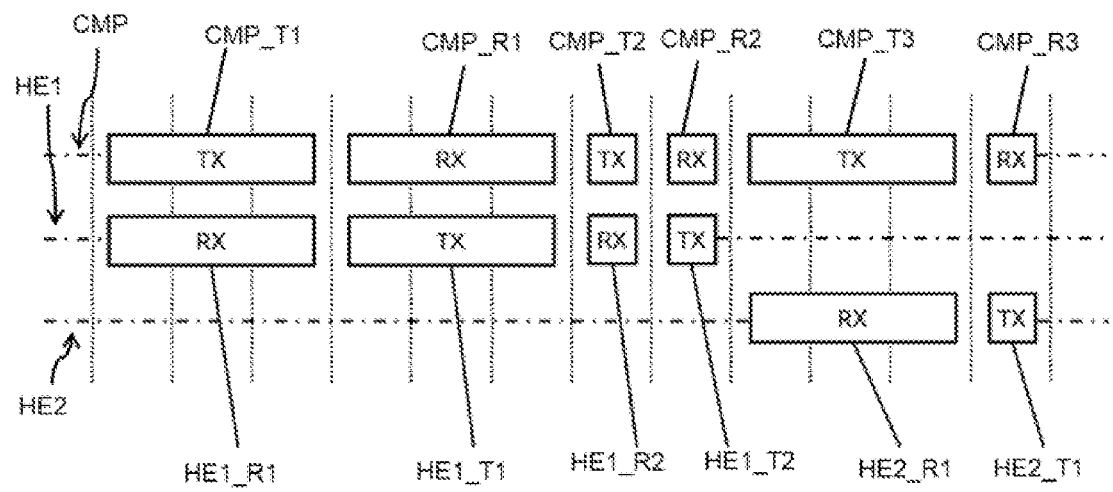
FIG. 8 illustrates a fourth transmission scheme with bidirectional acknowledgments in accordance with specific embodiments disclosed herein.

On FIG. 8, a fourth transmission scheme is shown, which corresponds to the case of an operation mode with bidirectional acknowledgments.

As illustrated, audio signals received by the right and left hearable devices are acknowledged by the right and left hearable devices and the voice signals transmitted by the right and/or left hearable devices are acknowledged by the computing device.

In an example, HE1_R1 may comprise right channel audio data, HE1_T1 may comprise an acknowledgment of HE1_R1 and a transmission of voice data by a microphone of HE1, HE1_R2 may comprise an acknowledgment of HE1_T1, HE1_T2 may be a null or empty packet, HE2_R1 may comprise left channel audio data while HE2_T1 may comprise an acknowledgment of HE2_R1.

Advantageously, such transmission scheme is carried out using constant rate isochronous links such as eSCO links so as to provide low latency bidirectional audio and voice Bluetooth communication.

Figure 9:
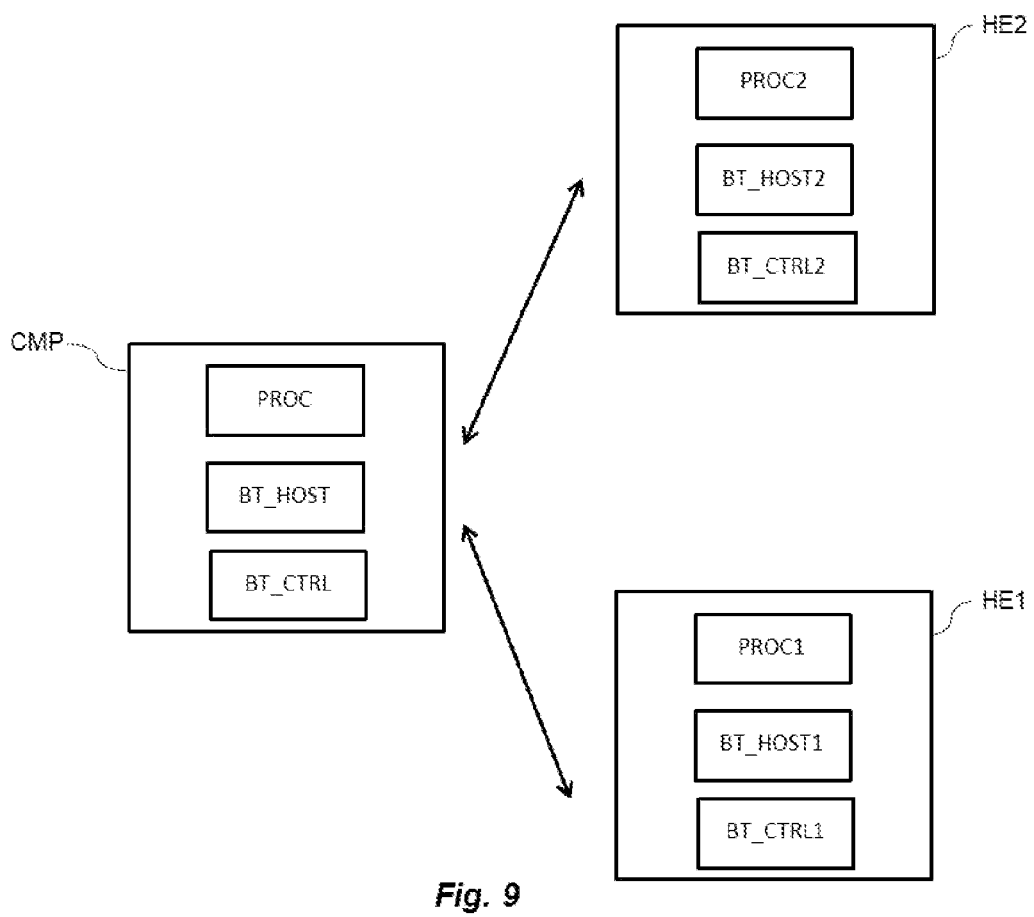
FIG. 9 illustrates devices for communicating audio and/or voice signals in accordance with specific embodiments disclosed herein.

FIG. 9 illustrates an example of devices for communicating audio and voice signals, and for rendering an audio signal, according to an embodiment.

A computing device or a Bluetooth hearable device comprises a host supporting a host stack of a Bluetooth protocol and a controller supporting a controller stack of the Bluetooth protocol.

In an example, a computing device CMP comprises a processor PROC, a Bluetooth host BT_HOST and a Bluetooth controller BT_CTRL.

As illustrated, the computing device CMP is linked to a primary audio rendering device, here the right hearable device HE1, using a right audio and voice communication link, and to a secondary audio rendering device, here the left hearable device HE2, using a left audio and voice communication link. Each of the hearable devices also comprises a processor, respectively PROC1 and PROC2, a Bluetooth host, respectively BT_HOST1 and BT_HOST2, and a Bluetooth controller, respectively BT_CTRL1 and BT_CTRL2. Each of the processors PROC1 and PROC2 comprises a local clock (not represented), called respectively CLK1 and CLK2. Each of said local clocks can be used to schedule any type of output, such as an audio signal to render.

In an example, each of the aforementioned processors PROC, PROC1 and PROC2 are configured to run an implementation of the Bluetooth host on the corresponding device, BT_HOST, BT_HOST1 and/or BT_HOST2.

In an example, the Bluetooth controller BT_CTRL1 (or BT_CTRL2) of HE1 (or HE2) is also implemented on the processor PROC1 (or PROC2).

In an example, the computing device CMP is advantageously a Bluetooth dongle. A Bluetooth dongle can be configured to directly receive audio and/or voice signal through a USB or USB-C port and can be adapted to any existing device with such port without modifying it. The computing device may also be a smartphone, a desktop, a laptop or, in general, any kind of processor configured for receiving and rendering audio and/or voice signals.

Each of the audio and voice Bluetooth communication links allows the reception and transmission of audio and/or voice signals by the hearable devices. In particular, the right audio and voice Bluetooth communication link may comprise a right downlink for receiving a right channel of an audio signal by the right hearable device, and the left audio and voice Bluetooth communication link may comprise a left downlink for receiving a left channel of an audio signal by the left hearable device.

Each of the audio and voice Bluetooth communication link comprises a constant rate isochronous link. In particular, the right audio and voice Bluetooth communication link comprises a first constant rate isochronous link and the left audio and voice communication link comprises a second constant rate isochronous link. Using constant rate isochronous links allows reducing the jitter of the transmission of the audio signal thus allowing its rendering with a low latency.

In an example, the audio and voice Bluetooth communication links are established between the computing device CMP and each of the hearable devices so that the three devices CMP, HE1 and HE2 share a physical radio channel and all their respective controllers are synchronized to a common clock.

In an example, the computing device CMP corresponds to a master device and the hearable devices HE1 and HE2 correspond to slave devices. The controller of CMP provides a synchronization reference, while the controllers of HE1 and HE2 may be synchronized to the Bluetooth clock of the master device.

A Bluetooth clock is defined by the Bluetooth standard. A Bluetooth clock may typically be a 28-bit counter that ticks in units of 312.5 microseconds, which corresponds to half a time slot and a clock rate of 3.2 kHz.

Herein, each constant rate isochronous link is scheduled with a clock CLK of a Bluetooth controller of the computing device CMP, as described hereafter. Advantageously, the first and second constant rate isochronous links are scheduled so as to not overlap, meaning that they are separated by a time interval.

In particular, the first constant rate isochronous link may be set up with a transmission period T and a first time offset (from CLK origin) defined as D1. The second constant rate isochronous link may be set up with a same transmission period T as for CMP and HE1, and with a second time offset (from CLK origin) defined as D2, the value of D2 and D1 being different. In this case, the time interval between the first and the second constant rate isochronous link is thus equal to D2−D1.

For instance, the two time offsets D1 and D2 are defined such that the first constant rate isochronous link and the second constant rate isochronous link are respectively scheduled at a value of the clock time CLK such that said CLK value modulo the time interval T is respectively equal to D1 and D2, namely such that "CLK mod T=D1" and "CLK mod T=D2".

Herein, "X modulo Y", abbreviated as "X mod Y", is defined as the remainder of the Euclidean division of "X" by "Y", where "X" is the dividend and "Y" is the divisor.

In various embodiments, it is possible to ensure a synchronization of the rendering of the right and left channels by two hearable devices HE1 and HE2, and specifically, a synchronization of their corresponding local clocks CLK1 and CLK2 so that said local clocks are synchronized on a same clock domain.

In an example, a synchronization of the rendering of the right channel by the right hearable device HE1 and the rendering of the left channel by the left hearable device HE2 is realized, so as to provide an accurate stereo rendering. Such synchronization requires synchronizing the local clocks of the hearable devices used to render their respective channels together and compensating the time interval between the two audio and voice Bluetooth communication links.

Herein, by "synchronization of the rendering", it is meant that the renderings of the audio signal by the hearable devices are not shifted by a delay greater than a predefined threshold (the threshold depending on the application and the ear tolerance). For instance, in the case of wireless earbuds, this delay should not exceed 20 microseconds.

In an example, each Bluetooth hearable device is able to synchronize its local clock with a signal that is synchronized on the two hearable devices, so that all of their local clocks are mutually synchronized.

In an example, each local clock CLK1 and CLK2 is synchronized with the clock CLK which is used for scheduling the constant rate isochronous links which are created between the computing device CMP, HE1 and HE2. Such clock CLK is available to the Bluetooth controllers BT_CTRL, BT_CTRL1 and BT_CTRL2 as the computing device CMP, the right hearable device HE1 and the left hearable device HE2 share a common Bluetooth physical radio channel. This allows having a common reference timing on both left and right hearable devices in order to synchronize their respective outputs. Regularly carrying out such synchronization steps allows avoiding jitter between the local clocks CLK1 and CLK2.

For instance, the three devices CMP, HE1 and HE2 may be in a same Bluetooth piconet and the common clock CLK may be the Bluetooth piconet clock. The local clock of the computing device CMP and of each Bluetooth hearable device HE1 and HE2 can be synchronized with the Bluetooth piconet clock, and thus all the local clocks of the devices are synchronized.

Synchronization steps can be carried out for each hearable device, either simultaneously or successively. For instance, during a first synchronization step, a local clock CLK1 of HE1 is synchronized with the local clock CLK of CMP. During a second synchronization step, a local clock CLK2 of HE2 is synchronized with CLK.

Reading of the reference clock CLK can be associated with the reading of a clock that is shared by the controller and the host. Indeed, such reference clock CLK may not be available directly to the host and may be provided asynchronously. In this case, when the controller retrieves the reference timing, it also reads a first value T1 of the shared clock. It then sends both the reference timing and the first value of the shared clock to the host in an asynchronous or a synchronous way. When the host receives the reference timing and the first value of the shared clock, it reads a second value T2 of the shared clock. Then based on the two values of the shared clock, the host can compute the time lag based on the difference T2−T1, and recompute a value of the reference clock CLK with a good accuracy.

In order to compensate for time differences between the two constant rate isochronous links, each hearable device determines a value of its local clock for rendering its corresponding channel, said value being determined such that the renderings are synchronized. Such synchronization can be obtained either by compensating the time interval between the first and second constant rate isochronous links by the computing device or by the hearable devices.

Figure 10:
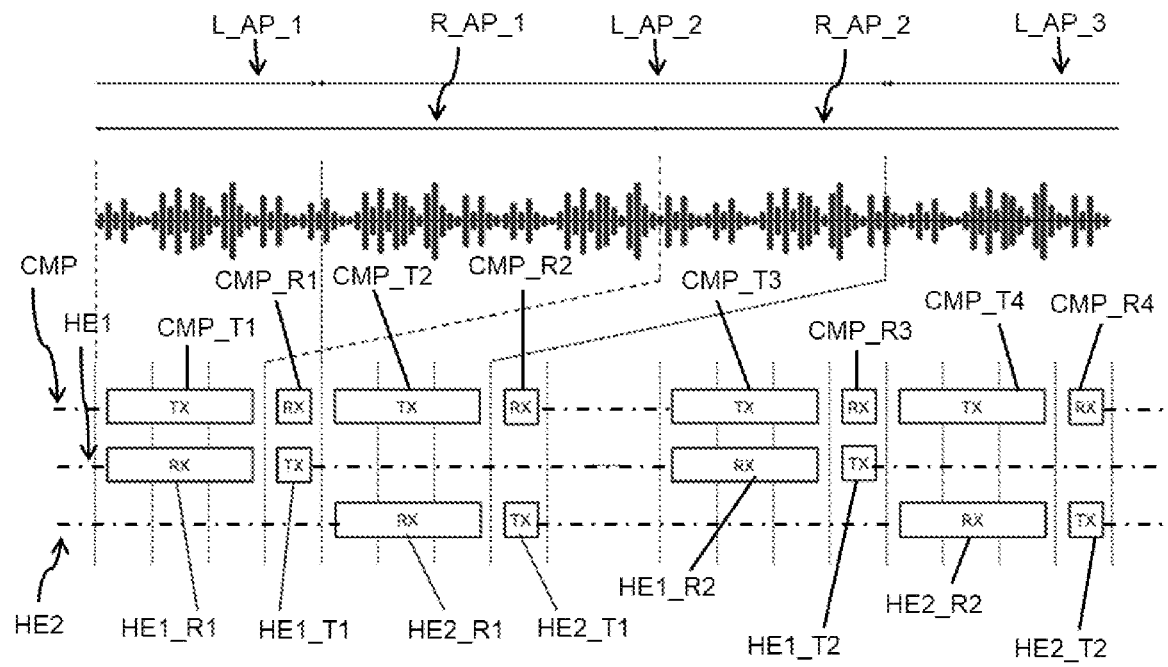
FIG. 10 illustrates a time interval compensation scheme in accordance with specific embodiments disclosed herein.

FIG. 10 illustrates an example of time interval compensation by a computing device in order to perform a synchronization between them.

In an example, and in view of rendering an audio signal by the two hearable devices HE1 and HE2, the computing device CMP transmits a first data packet CMP_T1 corresponding to the right channel of the audio signal which is received by the right hearable device HE1 as the right downlink data packet HE1_R1. Then, a right uplink packet HE1_T1 is transmitted by HE1 and is received by CMP as the packet CMP_R1.

A similar transmitting scheme is carried out for communicating data packets between the computing device CMP and the left hearable device HE2. The computing device CMP transmits a second data packet CMP_T2 corresponding to the left channel of the audio signal which is received by the left hearable device HE2 as the left downlink data packet HE2_R1. Then, a left uplink packet HE2_T1 is transmitted by HE2 and is received by CMP as the data CMP_R2.

Said uplink packets may be signaling packets for acknowledging the downlink data packet or a data packet including voice data of a voice signal and/or acknowledgment of the downlink data packet. Additional signaling packets may be transmitted and/or received between the reception of the downlink packet and the transmission of the uplink packet and are not illustrated in the present case.

This allows transmitting downlink data packets so that a first downlink packet comprises a first part of the audio signal, and a second downlink packet comprises a second part of the audio signal. For instance, the right downlink data packet HE1_R1 received by HE1 comprises a first part R_AP_1 of the right channel of the audio signal and the left downlink data packet HE2_R1 received by HE2 comprises a second part L_AP_2 of the left channel of the audio signal.

Also, in the present example, this allows transmitting the second downlink packet with a delay, said delay being such that the second part of the audio signal is delayed from the first part by a time interval. Advantageously, said time interval corresponds to the time interval between the two isochronous links BLNK1 and BLNK2 which are used in the present example for transmitting the data packets. For instance, the second part of the audio signal L_AP_2 is delayed from the first part of the audio signal R_AP_1 by the time interval between the two isochronous links. This allows compensating the time interval between the two isochronous links to ensure a synchronization of the right and left channels by the two hearable devices. In an example such time interval is equal to the difference of the values of the offsets D2 and D1, D2−D1, as described previously.

In the present case, the value of D2 can be advantageously determined so that the left downlink data packet is transmitted by the computing device directly after the right uplink packet or after the acknowledgment of the right uplink packet. In another example, the value of D1 could be advantageously determined so that the right downlink data packet is transmitted by the computing device directly after the left uplink packet or after the acknowledgment of the left uplink packet.

Each hearable device can be configured for determining a value of its local clock for a synchronized rendering of its associated channel of the audio signal. This can be achieved when each of the local clocks of the hearing devices HE1 and HE2 are synchronized with the clock CLK of CMP, so that they are also synchronized with each other. In the following, we will designate the shared clock by CLK.

In an example, the downlink data packets received by the hearable devices HE1 and HE2 may be timestamped to be played in a synchronized way. In this case, a value of each hearable device for carrying out a synchronized rendering of the audio signal is based on the corresponding received timestamps.

In another example, a value of the local clock of each hearable device for carrying out a synchronized rendering of the audio signal can be determined based on the reception timing of each downlink data packet.

For instance, the right uplink data packets are fully received by HE1 from CMP at a time which corresponds to the value of the CLK clock TS, said value being equal to $TS=D1+n*T+TX1$, where D1 is the offset of the first constant rate isochronous link, T is the period of the first constant rate isochronous link, "n" is an integer and TX1 the transmission window duration of the right downlink data packet.

Similarly, the left downlink data packets are fully received by HE2 from CMP at a time which corresponds to the value of the CLK clock TS', said value being equal to $TS'=D2+n*T+TX2$, where D2 is the offset of the second constant rate isochronous link and TX2 the transmission window duration of the left downlink data packet.

Advantageously, as the right and left downlinks are configured using the same downlink codec, the right and left downlink data packets can be from the same packet type and TX1=TX2=TX, where TX is the transmission window duration of the downlink data packets.

As the left and right Bluetooth communication links are constant rate isochronous links, the next right and left downlink data packets are respectively fully received at the following CLK clock values: $D1+(n+1)*T+TX$ and $D2+(n+1)*T+TX$.

Advantageously, the rendering of the right and left downlink data can be carried out at a time equal to the reception timing plus a fixed delay. For instance, the rendering of the right data may be carried out by HE1 at a time equal to TS+d, and the rendering of the left data may be carried out by HE2 at a time equal to TS'+d, where d is fixed delay which allows compensating for the small reception jitter of the packets on the isochronous links. This allows the rendering of the right and left data to be separated by a time interval equal to $TS'+d-(TS+d)=D2-D1$, which is compensated by the computing device CMP, thus providing a synchronized stereo rendering of the left and right channels by the right and left hearable devices.

The aforementioned steps may be carried out over again, that is, in an iterative way for each reception of an uplink data packet including part of the audio signal.

In another example, retransmissions of right and/or left data packets may occur, for instance, if said packets are erroneous or corrupted. In this case, a right downlink data packet may be fully received between CLK clock values TS and TS+RTX where RTX is the retransmission window maximal duration. Similarly, a left downlink data packet may be fully received between CLK clock values TS' and TS'+RTX. Advantageously, the rendering of the right and left data can be carried out at a time equal to the furthest reception timing plus a fixed delay. For instance, the rendering of the right data may be carried out by HE1 at a time equal to TS+RTX+d and the rendering of the left data may be carried out by HE2 at a time equal to TS'+RTX+d. This allows the rendering of the right and left data to be separated by a time interval equal to $TS'+RTX+d-(TS+RTX+d)=D2-D1$, which is compensated by the computing device CMP, thus providing a synchronized stereo rendering of the left and right channels by the right and left hearable devices.

As described here above, such time interval compensation by the computing device CMP leads to a lower latency, typically of the order of few milliseconds.

Indeed, the corresponding Bluetooth latency can be computed as being equal to the sum of the downlink transmission window, the fixed delay for compensating jitter of the constant rate isochronous links, and the downlink retransmission window if retransmissions are allowed.

For instance, using eSCO link as constant rate isochronous links with 2-EV3 downlink data packets, with a fixed delay of 100 microseconds and with one retransmission allowed, the corresponding latency is equal to 625 microseconds, plus 100 microseconds, plus two times 625 microseconds, which is equal to less than 2 milliseconds.

The overall latency can be computed by adding the Bluetooth latency, the encoding/decoding algorithm delay and the audio processing delay.

Herein, the overall latency includes the latency due to the algorithmic codec. The more time the codec requires for performing decoding, the higher the latency. Thus, the examples and embodiments described previously allow preventing the audio signal codec from using a large amount of the bandwidth. This is specifically advantageous whenever the Opus codec is used.

Figure 11:
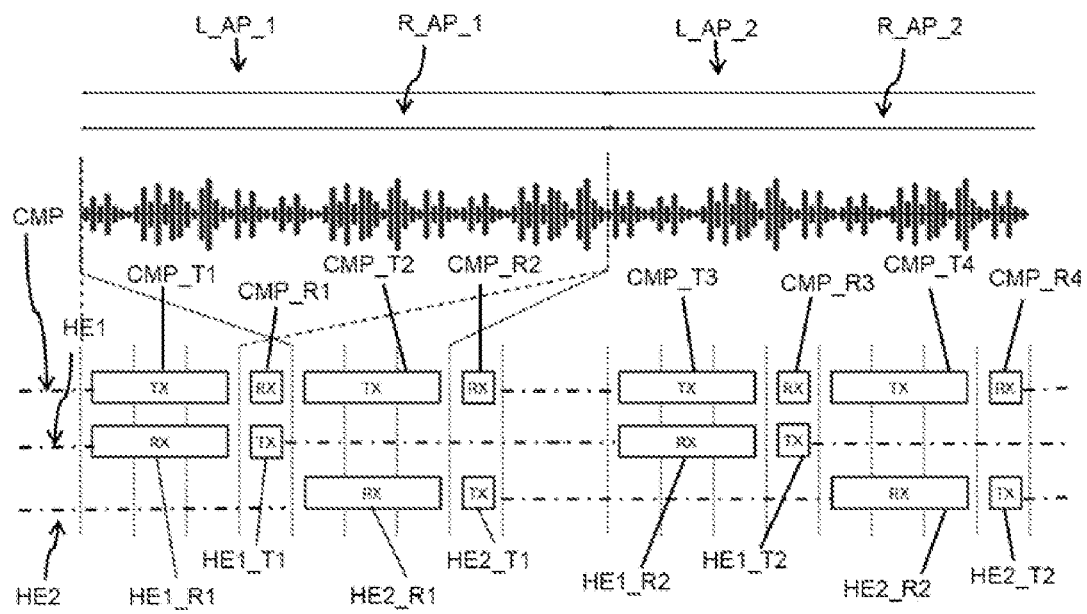
FIG. 11 illustrates a time interval compensation scheme in accordance with specific embodiments disclosed herein.

FIG. 11 illustrates another example of time interval compensation in order to ensure synchronization of the hearable devices.

As illustrated, in the present case, the computing device CMP transmits a first data packet CMP_T1 containing a first part of the audio signal R_AP_1 to HE1. Then, it sends a second data packet CMP_T2 to HE2, said second data packet containing the second part of the audio signal L_AP_2.

A synchronization is then carried out on the hearable devices by determining values of their respective local clocks for a synchronized rendering of the audio signal based on the reception timing of the downlink data packet and on at least one of the two offsets of the constant rate isochronous links.

According to a first possibility, one of the two hearable devices may then compensate the time interval between the two constant rate isochronous links, assuming the two offsets are known. For instance, the rendering of the first downlink data packet is carried out at a value of the local clock being equal to the sum of the reception timing plus a fixed delay for compensating jitter plus the time interval. For instance, the rendering of the right data may be carried out by HE1 at a time equal to TS+D1−D2+d and the rendering of the left data may be carried out by HE2 at a time equal to TS'+d. This allows the rendering of the right and left data to be separated by a time interval equal to $TS'+d-(TS+D1-D2+d)=0$. Thus, the time interval is compensated by the right hearable device and provides a synchronized stereo rendering of the left and right channels by the right and left hearable devices. In another example, the time interval may be compensated by the left hearable device in a similar way.

Similarly, if retransmissions are allowed, the rendering of the first downlink data packet is carried out at a value of the local clock being equal to the sum of the furthest reception timing plus a fixed delay for compensating jitter plus the time interval. For instance, the rendering of the right data may be carried out by HE1 at a time equal to TS+RTX+D1−D2+d and the rendering of the left data may be carried out by HE2 at a time equal to TS'+RTX+d. This allows the rendering of the right and left data to be separated by a time interval equal to $TS'+RTX+d-(TS+RTX+D1-D2+d)=0$. Thus, the time interval is compensated by the right hearable device and provides a synchronized stereo rendering of the left and right channels by the right and left hearable devices. In another example, the time interval may be compensated by the left hearable device in a similar way.

According to a second possibility, a first part of the time interval is compensated by the first hearable device and a second part of the time interval is compensated by the second hearable device.

Figure 12:
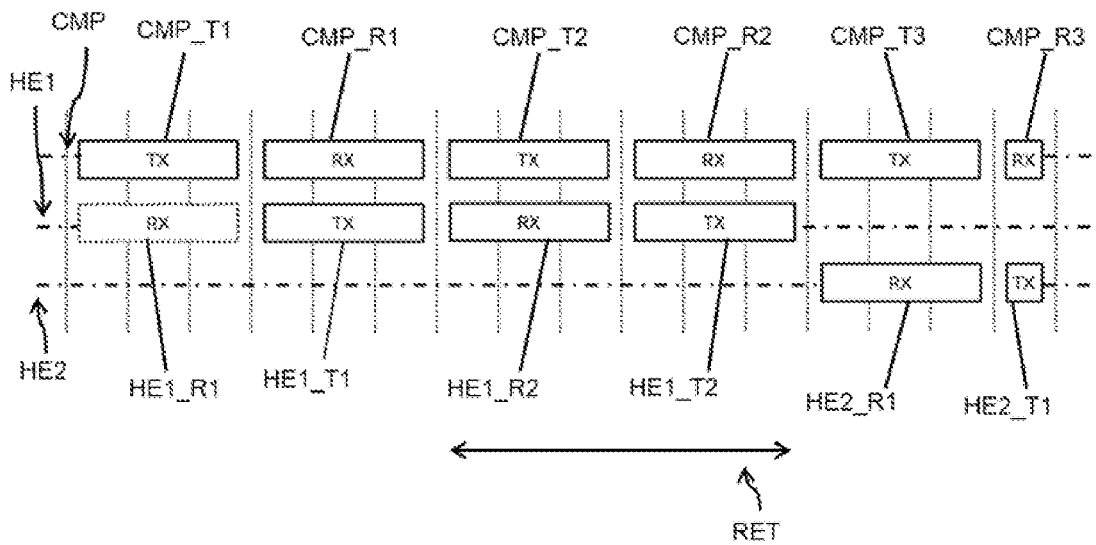
FIG. 12 illustrates a transmission scheme with retransmissions in accordance with specific embodiments disclosed herein.

FIG. 12 illustrates a transmission scheme with retransmissions according to an embodiment of the disclosure.

As illustrated, a symmetrical bitrate may be chosen for the first audio and voice Bluetooth communication link and an asymmetrical bitrate may be chosen for the second audio and voice Bluetooth communication link. For instance, 3-slots packets may be used for the right downlink and uplink packets CMP_T1, CMP_R1, CMP_T2, CMP_R2 transmitted and received by the computing device CMP, while a 3-slots packets may be used for the left downlink packets CMP_T3 and 1-slot packets may be used for the left uplink packets CMP_R3.

In an example, the first right downlink data packet CMP_T1 transmitted by the computing device CMP is not correctly received by the right hearable device HE1 and a retransmission of the packet is requested.

In the present case, the uplink packet HE1_T1 is preferably a negative acknowledgment so as to request explicitly a retransmission of the first right downlink data packet by CMP. In another example, the retransmission may be implicitly requested by the absence of a positive acknowledgment. The content of the first downlink data packet CMP_T1 is then retransmitted into the second downlink data packet CMP_T2.

This allows retransmitting an uplink or a downlink packet in a retransmission window RET, if a packet is not successfully acknowledged.

In an example, the size of the retransmission window RET is determined during the creation of the constant rate isochronous link(s).

In another example, the size of the retransmission window RET depends on the available Bluetooth bandwidth.

For instance, whenever defining a first retransmission window associated to the right hearable device HE1 and a second retransmission window associated to the left hearable device HE2, one can request that the sum of the durations of the first transmission window, the first retransmission window, the second transmission window and the second retransmission window is smaller than the available Bluetooth bandwidth, said transmission windows being defined by the sum of the durations of the transmission of a downlink and an uplink data packet.

In an example, the size (i.e., the duration) of the retransmission window RET and/or of any retransmission sub-window(s) that said retransmission window comprises is adapted so that a part of the available Bluetooth bandwidth can be used for other purposes than those described so far, such as other profiles or data signaling.

In an example, a negative acknowledgment can be transmitted from one Bluetooth hearable device to the computing device CMP in a same data packet as the voice data captured by a microphone of one of the hearable devices, thus avoiding the use of an extra signaling packet. This allows minimizing the uplink latency.

These examples allow providing a low-latency operation mode, in particular when retransmissions are present.

Figure 13:
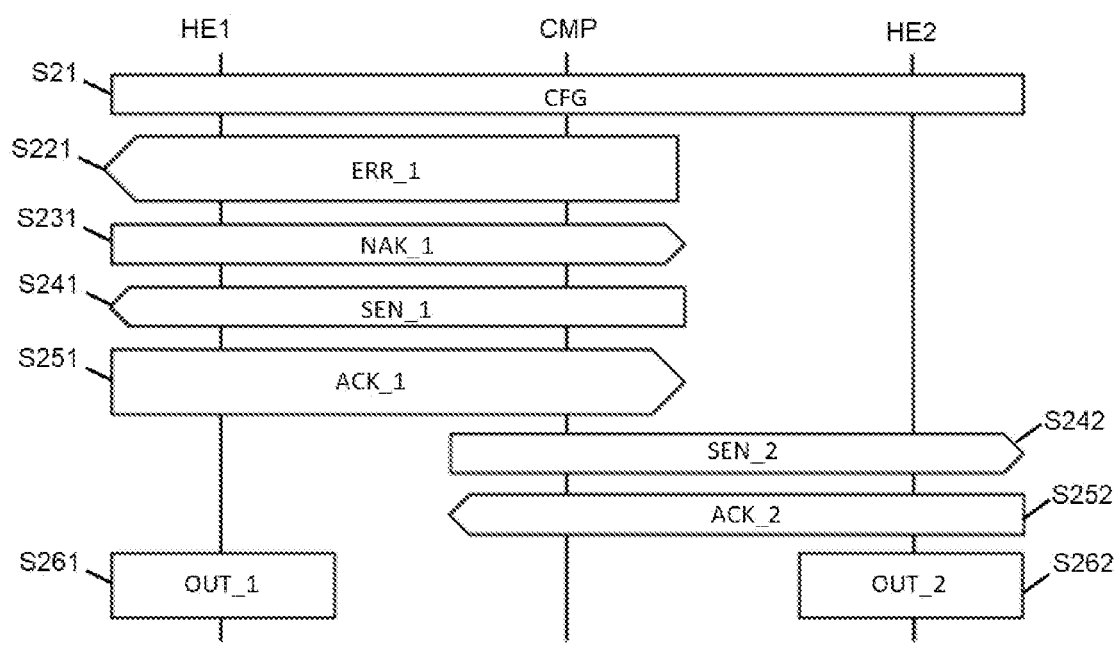
FIG. 13 illustrates a flowchart for synchronizing audio signal outputs in accordance with specific embodiments disclosed herein.

FIG. 13 illustrates a flowchart of steps which can be carried out for performing a synchronization with hearable devices and a computing device.

As illustrated, the step S21 comprises a configuration of HE1, wherein an uplink codec and a downlink codec are negotiated between CMP and HE1. Here, the step S21 further comprises a configuration of HE2, wherein an uplink codec and a downlink codec are negotiated between CMP and HE2. The negotiation of the uplink codec can be carried out either simultaneously or successively with the negotiation of the downlink codec.

Following step S21, the computing device CMP transmits erroneous or corrupted right-channel audio data during the step S221.

If said data is erroneous or corrupted, it cannot be processed by the Bluetooth hearable device HE1. In that case, HE1 sends back a non-acknowledgment message to CMP during step S231.

Following step S231, the computing device CMP attempts at transmitting right-channel audio data encoded with the downlink codec to HE1 during step S241. If said transmitting is successful, the right hearable device HE1 then transmits an acknowledgment to CMP during step S251. If the transmitting is not successful, or if the right-channel audio data received by HE1 is erroneous or corrupted, then the steps S231 and S241 may be carried out once again.

In an example, the acknowledgment may be comprised in the same packet as voice data captured by a microphone of HE1 and encoded with the uplink codec.

The previous steps can also be applied similarly to left-channel audio data and to the second hearable device HE2.

Following step S251, and in general, upon receipt of an acknowledgment by CMP, the computing device CMP transmits left-channel audio data to the left hearable device HE2 during the step S242. This is performed at a time which corresponds to the value of a timestamp TS, said data being encoded with the downlink codec.

Upon receipt of said left-channel audio data by the second hearable device HE2 and/or upon transmittal of the left-channel audio data by the computing device CMP, output steps S261 and S262 can be carried out by each of the hearable devices HE1 and HE2.

Figure 14:
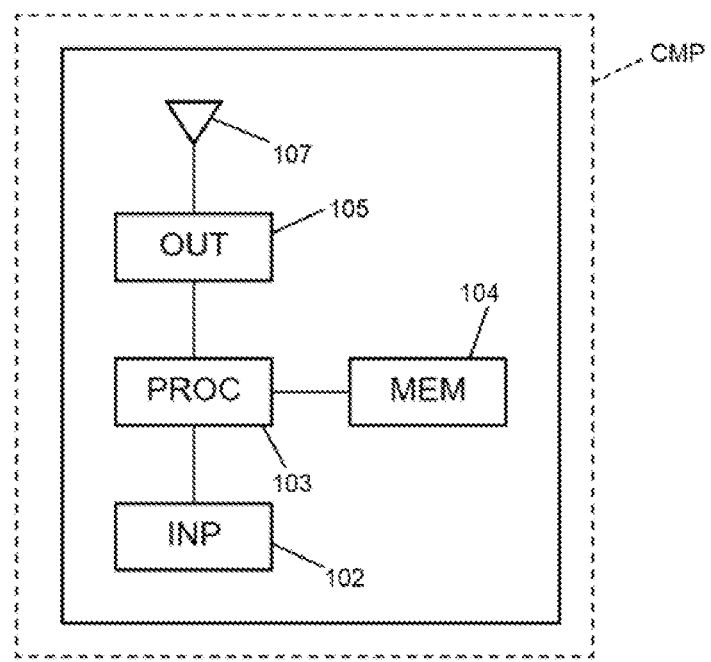
FIG. 14 illustrates a computing device in accordance with specific embodiments disclosed herein.

FIG. 14 represents an example of computing device according to an embodiment.

As illustrated, the computing device CMP can comprise a memory 104 to store program instructions loadable into a circuit and adapted to cause a circuit 103 to carry out the embodiments described previously when the program instructions are run by the circuit 103.

The memory 104 may also store data and useful information for carrying the steps of the present invention as described above.

The circuit 103 may be for instance a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a Field-Programmable Gate Array, FPGA, chip.

The computing device CMP can comprise an input interface 102 for the reception of a control signal relative to audio data to be played by a loudspeaker system according to the invention and an output interface 105, e.g. a Bluetooth interface, for transmitting audio signals via an antenna 107.

To ease the interaction with the device, the computing device CMP may contain a Human Machine Interface (not represented) connected to the circuit 103.

Figure 15:
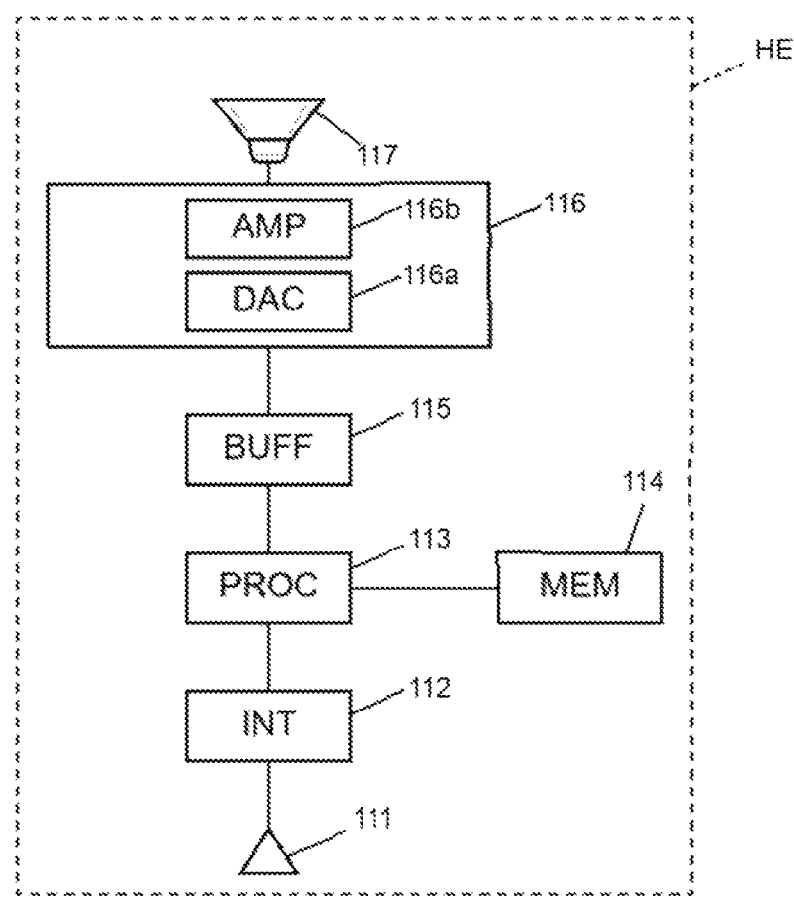
FIG. 15 illustrates a hearing device in accordance with specific embodiments disclosed herein.

FIG. 15 represents an example of Bluetooth hearable device, here a hearable device HE, e.g. the right hearable device HE1 or the left hearable device HE2.

The Bluetooth hearable device HE can comprise a memory 114 to store program instructions loadable into a circuit and adapted to cause circuit 113 to carry out the steps of the present invention when the program instructions are run by the circuit 113. The memory 114 may also store data and useful information for carrying the embodiments as described previously.

The circuit 113 may be for instance a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip.

This Bluetooth hearable device HE can further comprise an input wireless Bluetooth interface 112 receiving audio signals and establishing bidirectional wireless links with a computing device via a Bluetooth antenna 111, an output audio circuit 116 that contains at least a digital-to-analog converter, DAC, 116a and an audio amplifier 116b, an audio buffer 115 to temporarily store digitized audio before it is transferred to the audio output circuit. In one possible example the buffer 115 may be included in the memory 114. The device can further comprise a loudspeaker 117 to convert the electronic signals output from the amplifier into sound.

The Bluetooth hearable device HE can further comprise a microphone (not represented) and a microphone input circuit (not represented) for voice data capture and transmission as a voice signal.

The present invention is not limited to the embodiments and examples described above. Aside from earbud pair systems, in which data may be sent to each pair of earphones, the disclosed methods also apply to loudspeakers and other types of audio devices.

Depending on the embodiment chosen, certain acts, actions, events or functions of each of the methods described herein may be performed or occur in a different order from that in which they were described, or may be added, merged or not to be performed or not to occur, as the case may be. In addition, in some embodiments, certain acts, actions or events are performed or occur concurrently and not successively.

Although described through a number of detailed exemplary embodiments, the proposed method and equipment for implementing the method includes various alternatives, modifications and improvements which will be apparent to those skilled in the art, it being understood that these various variants, modifications and improvements fall within the scope of the invention, as defined by the following claims. In addition, various aspects and features described above may be implemented together, or separately, or substituted for each other, and all of the various combinations and sub-combinations of aspects and features are within the scope of the invention. In addition, some of the systems and equipment described above may not incorporate all of the modules and features described for the preferred embodiments.

Herein, expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described embodiments of the present invention, it will be understood by those skilled in the art that various other modifications may be made, and equivalents may be substituted, without departing from the true scope of the present invention. Additionally, many modifications may be made to adapt a particular situation to the teachings of embodiments of the present invention without departing from the scope of the invention. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

What is claimed is:

1. A method for communicating audio and voice signals, said method being carried out by a right hearable device and a left hearable device, wherein the method comprises:
   creating a right audio and voice Bluetooth communication link between the right hearable device and a computing device, said right audio and voice Bluetooth communication link comprising a right downlink and a right uplink;
   creating a left audio and voice Bluetooth communication link between the left hearable device and the computing device, said left audio and voice Bluetooth communication link comprising a left downlink and a left uplink;
   configuring said right and left downlinks with a downlink audio codec, and at least one of said right and left uplinks with an uplink voice codec;
   receiving, by the right hearable device through the right downlink, a right channel of a downlink audio signal from the computing device, said right channel being encoded with said downlink audio codec;
   receiving, by the left hearable device through the left downlink, a left channel of the downlink audio signal from the computing device, said left channel being encoded with the downlink audio codec; and
   transmitting, to the computing device, an uplink voice signal by said at least one of the right hearable device and the left hearable device through the at least one of the right uplink and the left uplink, said uplink voice signal being encoded with said uplink voice codec.

2. The method of claim 1, wherein the downlink audio codec is adapted for encoding the downlink audio signal with a sampling rate larger than 44100 Hz and smaller than 96000 Hz and wherein the uplink voice codec is adapted for encoding the uplink voice signal with a sampling rate larger than 8000 Hz and smaller than 16000 Hz.

3. The method of claim 1, wherein the downlink audio codec comprises at least one of an Opus codec, an Advanced Audio Coding (AAC) codec, a Low Complexity Subband (SBC) codec, a Low Complexity Communication (LC3) codec, a LDAC codec, a Low Latency High-Definition Audio Codec (LHDC) and an AptX codec.

4. The method of claim 1, wherein the uplink voice codec comprises at least one of a modified SBC (mSBC) codec and a Continuously Variable Slope Delta (CVSD) codec.

5. The method of claim 1, wherein an acknowledgment of the receiving by at least one of the left hearable device and the right hearable device is included in the transmitting of the uplink voice signal.

6. The method of claim 1, wherein an acknowledgment of the receiving by at least one of the left hearable device and the right hearable device is transmitted using at least one of the uplinks before the transmitting of the uplink voice signal.

7. The method of claim 1, wherein the uplink voice signal is sent from one of: the right hearable device; the left hearable device; and both the left hearable device and the right hearable device.

8. The method of claim 1, wherein each of the right and left audio and voice Bluetooth communication links (BLNK1, BLNK2) comprises a constant rate isochronous link.

9. The method of claim 8, wherein the constant rate isochronous link is one of an Synchronous Connection-Oriented (SCO) link, an enhanced SCO (eSCO) link, and a Bluetooth Low Energy (BLE) isochronous link.

10. The method of claim 8, wherein the two constant rate isochronous links are scheduled using a reference clock of the computing device, the method further including:
synchronizing a local clock of each hearable device with the reference clock; and
rendering each channel of each hearable device based on their respective local clocks.

11. The method of claim 10, wherein the rendering includes compensating a time interval between a transmission window of the right Bluetooth communication link and a transmission window of the left Bluetooth communication link.

12. The method of claim 11, wherein each of the transmission window of the right Bluetooth communication link and the transmission window of the left Bluetooth communication link includes a retransmission window.

13. A pair of hearable devices for rendering audio signals, wherein said pair of hearable devices comprises a right hearable device and a left hearable device:
wherein the pair of hearable devices are configured to:
create a right audio and voice Bluetooth communication link between a computing device and the right hearable device, said right audio and voice Bluetooth communication link comprising a right downlink and a right uplink;
create a left audio and voice Bluetooth communication link between the computing device and the left hearable device, said left audio and voice Bluetooth communication link comprising a left downlink and a left uplink;
configure said right and left downlinks with a downlink audio codec, and at least one of said right and left uplinks with an uplink voice codec;
receive, by the right hearable device through the right downlink, a right channel of a downlink audio signal from the computing device, said right channel being encoded with said downlink audio codec;
receive, by the left hearable device through the left downlink, a left channel of a downlink audio signal from the computing device, said left channel being encoded with said downlink audio codec; and
transmit, to the computing device, an uplink voice signal by said at least one of the right hearable device and the left hearable device through the at least one of the right uplink and the left uplink, said uplink voice signal being encoded with said uplink voice codec.

14. The pair of hearable devices of claim 13, further comprising a circuit, wherein the circuit is one of: a processor; and a processing unit.

15. The pair of hearable devices of claim 13, wherein the downlink audio codec is adapted for encoding the downlink audio signal with a sampling rate larger than 44100 Hz and smaller than 96000 Hz and wherein the uplink voice codec is adapted for encoding the uplink voice signal with a sampling rate larger than 8000 Hz and smaller than 16000 Hz.

16. The pair of hearable devices of claim 13, wherein the downlink audio codec comprises at least one of an Opus codec, an Advanced Audio Coding (AAC) codec, a Low Complexity Subband Coding (SBC) codec, a Low Complexity Communication (LC3) codec, a LDAC codec, a Low Latency High-Definition Audio Codec (LHDC) and an AptX codec.

17. The pair of hearable devices of claim 13, wherein the uplink voice codec comprises at least one of a modified SBC (mSBC) codec and a Continuously Variable Slope Delta (CVSD) codec.

18. The pair of hearable devices of claim 13, wherein an acknowledgment of the receiving by the at least one of the right hearable device and the left hearable device is included in the transmitting of the uplink voice signal.

19. The pair of hearable devices of claim 13, wherein an acknowledgment of the receiving by the hearable device is transmitted using at least one of the uplinks before the transmitting of the uplink voice signal.

20. One or more non-transitory computer readable storage medium, having stored thereon instructions that, when executed by a processor, cause the processor to carry out a method for communicating audio and voice signals, wherein the method comprises:
creating a right audio and voice Bluetooth communication link between a right hearable device and a computing device, said right audio and voice Bluetooth communication link comprising a right downlink and a right uplink;
creating a left audio and voice Bluetooth communication link between a left hearable device and the computing device, said left audio and voice Bluetooth communication link comprising a left downlink and a left uplink;
configuring said right and left downlinks with a downlink audio codec, and at least one of said right and left uplinks with an uplink voice codec;
receiving, by the right hearable device through the right downlink, a right channel of a downlink audio signal from the computing device, said right channel being encoded with said downlink audio codec;
receiving, by the left hearable device through the left downlink, a left channel of the downlink audio signal from the computing device, said left channel being encoded with the downlink audio codec; and
transmitting, to the computing device, an uplink voice signal by said at least one of the right hearable device and the left hearable device through the at least one of the right uplink and the left uplink, said uplink voice signal being encoded with said uplink voice codec.

\* \* \* \* \*